United States Patent [19]
Park

[11] Patent Number: 6,137,917
[45] Date of Patent: Oct. 24, 2000

[54] IMPULSE NOISE REDUCTION APPARATUS AND METHOD

[75] Inventor: Se-woong Park, Seoul, Rep. of Korea

[73] Assignee: Samsung Electronics Co., Ltd., Kyungki-do, Rep. of Korea

[21] Appl. No.: 09/133,429

[22] Filed: Aug. 13, 1998

[30] Foreign Application Priority Data

Nov. 10, 1997 [KR] Rep. of Korea ...................... 97-59070

[51] Int. Cl.[7] .................. G06T 5/00; G06K 9/40
[52] U.S. Cl. ................. 382/262; 382/262; 382/260; 382/261; 382/275; 382/272
[58] Field of Search .................................. 382/262, 260, 382/261, 275, 272

[56] References Cited

U.S. PATENT DOCUMENTS

| | | | |
|---|---|---|---|
| 4,782,389 | 11/1988 | Mayweather, III et al. | 382/272 |
| 4,827,533 | 5/1989 | Tanaka et al. | 382/261 |
| 5,148,278 | 9/1992 | Wischermann et al. | 382/260 |
| 5,327,240 | 7/1994 | Golston et al. | 382/275 |
| 5,787,203 | 7/1998 | Lee et al. | 382/262 |
| 5,798,846 | 8/1998 | Tretter et al. | 382/262 |

FOREIGN PATENT DOCUMENTS 9-214809  8/1997  Japan ............... H04N 5/213

*Primary Examiner*—Scott Rogers
*Assistant Examiner*—Gholam A Behpour
*Attorney, Agent, or Firm*—Sughrue, Mion, Zinn, Macpeak & Seas, PLLC

[57] ABSTRACT

An apparatus and method of reducing impulse noise using a median filter involve selecting a pixel of median_value from a plurality of pixels, comparing a reference range, determined by adding or subtracting an offset value to or from the selected median_value, with a mid_pixel among the plurality of pixels, to determine whether the input image signal has impulse noise and generate a noise coefficient depending on the presence of impulse noise, calculating a correlation between the luminance component of a pixel and the color component thereof depending on the noise coefficient, and cross-fading the pixel of median_value and the mid_pixel depending on the correlation.

7 Claims, 3 Drawing Sheets

| n-1 line | U1 | Y1 | V1 | Y2 |   | U2 | Y3 | V2 | Y4 |   | U3 | Y5 | V3 | Y6 |
|          | p1 |    |    |    |   | p2 |    |    |    |   | p3 |    |    |    | n-1 line  | U1 | Y1 | V1 | Y2 |   | U2 | Y3 | V2 | Y4 |   | U3 | Y5 | V3 | Y6 |
              p1                        p2                        p3 n line    | U4 | Y7 | Y4 | Y8 |   | U5 | Y9 | V5 | Y10 |   | U6 | Y11 | V6 | Y12 |
              p4                        p5                         p6 n+1 line  | U7 | Y13 | V7 | Y14 |   | U8 | Y15 | V8 | Y16 |   | U9 | Y17 | V9 | Y18 |
              p7                         p8                         p9 offset
median_value+offset
mid_pixel
median_value−offset

IMPULSE NOISE REDUCTION APPARATUS AND METHOD

BACKGROUND OF THE INVENTION

1. Field of the Invention

The present invention relates to an apparatus for reducing impulse noise, and more particularly, to an apparatus for reducing impulse noise using a median filter, and a method thereof.

2. Description of the Related Art

In general, an image signal includes impulse noise, the amplitude of which changes irregularly according to external or internal conditions. Thus, an image reproducing apparatus must remove the impulse noise to obtain an image of high quality.

FIG. 1 is a block diagram showing a typical impulse noise reduction apparatus.

An image signal consists of pixels. The mean of the image signal is obtained by determining a window of n pixels, e.g., five pixels a1, a2, a3, a4 and a5 in FIG. 1. Here, a5 is a mid_value. A subtractor 120 subtracts the mid_value 114 from the mean 112 and transmits the value to a comparator 130. The comparator 130 compares the value obtained from the subtractor 120 with a reference value. If the value is higher than the reference value, a first level, e.g., logic high, which indicates noise, is output, and if not, a second level, e.g., logic low, which indicates normal pixel data, is output. A multiplexer 140 selects either the mid_pixel 114 or the mean 112 according to the level applied by the comparator 130, and outputs the selected value. When the first level is applied, the mean 112 is selected and output.

However, the apparatus of FIG. 1 interprets high-frequency components 210 of the image signal as impulse noise, and thus selects the mean of the pixels corresponding thereto as shown in FIG. 2A, outputting an image signal having a deteriorated high-frequency component 220 as shown in FIG. 2B. Accordingly, the image signal obtained by the apparatus of FIG. 1 has deteriorated frequency characteristics, and therefore lower resolution.

SUMMARY OF THE INVENTION

It is an objective of the present invention to provide a method of selecting a pixel of median_value to reduce noise impulse without removing high-frequency components.

It is another objective of the present invention to provide an apparatus for selecting a pixel of median_value to reduce impulse noise without removing high-frequency components.

Accordingly, to achieve the first objective, there is provided a method of reducing impulse noise of an image signal composed of luminance and color components, comprising the steps of: selecting a pixel of median_value from a plurality of pixels; comparing a reference range, determined by adding or subtracting an offset value to or from the selected median_value, with a mid_pixel among the plurality of pixels, to determine whether the input image signal has impulse noise and generate a noise coefficient depending on the presence of impulse noise; calculating a correlation between the luminance component of a pixel and the color component thereof depending on the noise coefficient; and cross-fading the pixel of median_value and the mid_pixel depending on the correlation.

To achieve the second objective, there is provided an apparatus for reducing impulse noise of an image signal composed of luminance and color components, comprising: a median filter for selecting a pixel of median_value from a plurality of pixels; a comparator for comparing a reference range, determined by adding or subtracting an offset value to or from the selected median_value, with a mid_pixel, to determine whether impulse noise exists and generate a noise coefficient depending on the presence of impulse noise; a correlation calculator for calculating a correlation between the luminance component of the pixel and the color component thereof depending on the noise coefficient generated by the comparator; and a cross-fading unit for cross-fading the pixel of median_value and the mid_pixel depending on the correlation calculated by the correlation calculator.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
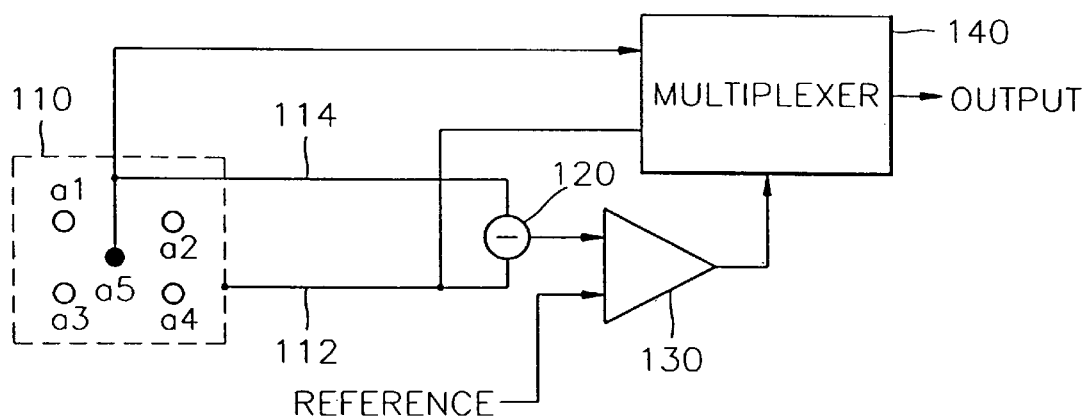
FIG. 1 is a block diagram showing a typical impulse noise reduction apparatus.
Figure 2A:
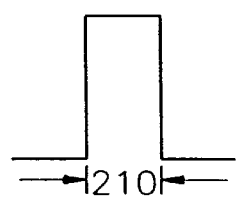
FIG. 2A is a waveform of an image signal having a high-frequency component.
Figure 2B:
FIG. 2B is a waveform of the image signal after impulse noise has been reduced by the apparatus of FIG. 1.
Figure 3:
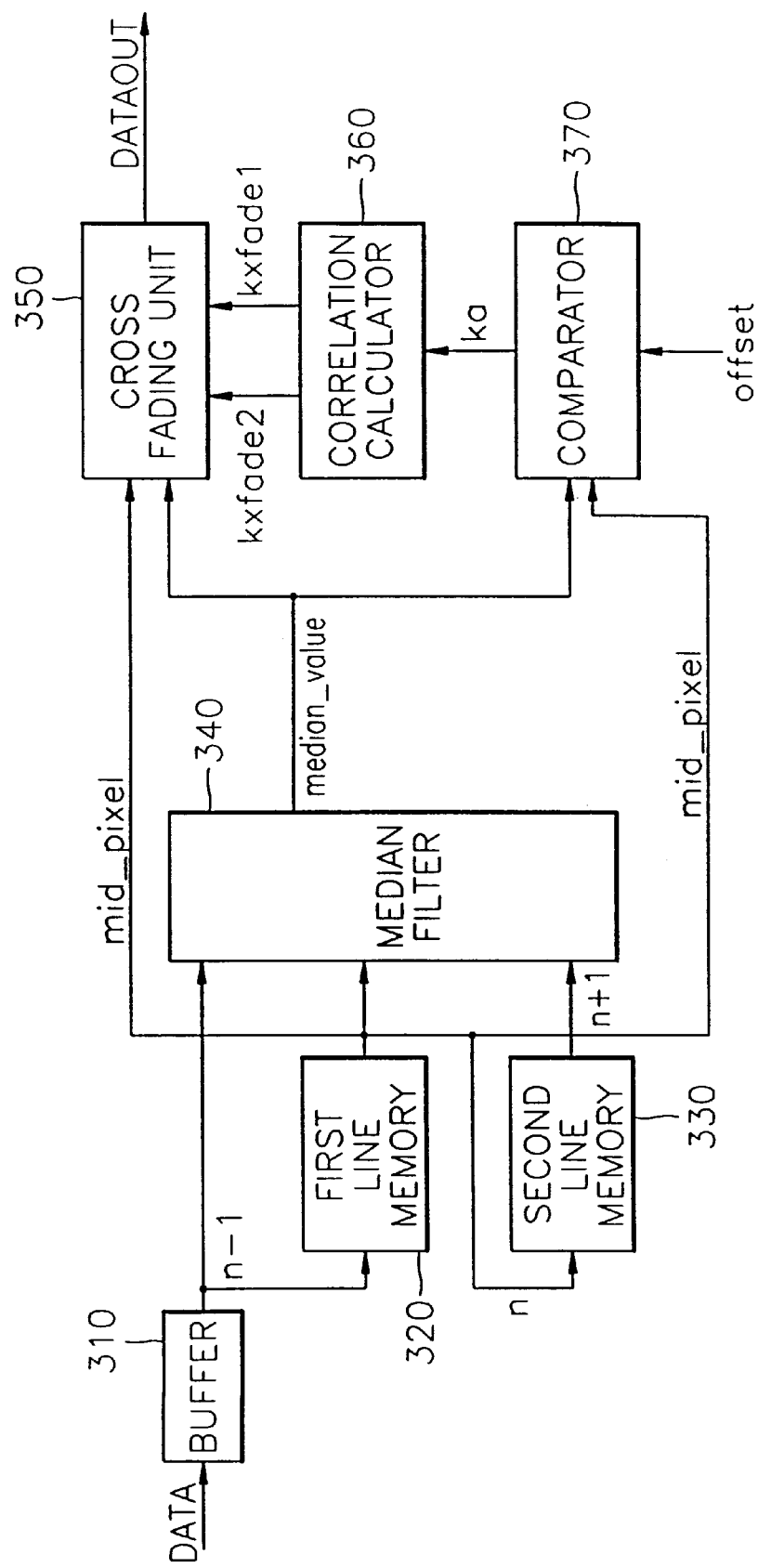
FIG. 3 is a block diagram showing an impulse noise reduction apparatus according to the present invention.

Referring to FIG. 3, the impulse noise reduction apparatus includes a buffer 310 for arranging image data, a first line memory 320 for delaying the image data output by the buffer 310, a second line memory 330 for delaying the image data delayed by the first line memory 320, a median filter 340 for receiving the image data from the buffer 310 and the first and second line memories 320 and 330 to select a pixel of a median_value 'MV', a comparator 370 for comparing the mid_pixel 'MP' with a value obtained by adding or subtracting the offset 'Q' to or from the median_value, to generate a noise coefficient 'ka', a correlation calculator 360 for generating correlation values (CV) including a first correlation value 'kxfade1' and a second correlation value 'kxfade2' according to the noise coefficient, and a cross fading unit 350 for generating image data in which the mid_pixel and a pixel of the median_value are cross-faded according to the first and second correlation values kxfade1 and kxfade2.

Figures 4, 5:
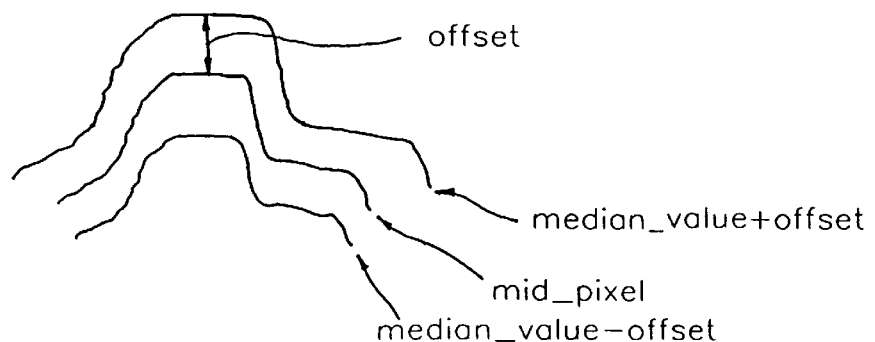
FIG. 4 shows windowing image data arranged in the median filter 340 of FIG. 3.
FIG. 5 shows signals compared by the comparator 370 of FIG. 3.

In FIG. 4, 'U' indicates an R-Y chrominance component, 'V' indicates, a B-Y chrominance component, and 'Y' indicates luminance.

The operation and effect of the present invention will be described with reference to FIGS. 3 through 5.

The image data includes pixels each of which is composed of a luminance component 'Y' and a color component 'C'. The buffer 310 arranges the input image data as shown in FIG. 4. The median filter 340 is comprised of a D flip-flop (not shown), a multiplexer (not shown) and a comparator (not shown) and selects a pixel of the median_value from the image data. That is, the median filter 340 receives an (n−1)th line pixel, an nth line pixel and an (n+1)th line pixel, and windows five pixels, e.g., U1, U3, U5, U7 and U9 of the three lines n, n−1 and n+1 as shown in FIG. 4. Here, the (n−1)th line pixels p1, p2 and p3 are currently input image data from buffer 310, and the nth line pixels p4, p5 and p6 and the (n+1)th line pixels p7, p8 and p9 are image data which have passed through the first and second line memories 320 and 330, respectively. Here, a pixel output from the first line memory 320 is a mid_pixel. In FIG. 4, the mid_pixel components (referred to as mid_pixels, hereafter) are U5, Y9, V5 and Y10.

In the median filter 340, five pixels are windowed in order to remove the impulse noise of the mid_pixels. That is, the windows of mid_pixels U5, Y9, V5 and Y10 are defined as follows.

| The window of U5; | U1 | | U3 |
|---|---|---|---|
| | | U5 | |
| | U7 | | U9 |
| The window of V5; | V1 | | V3 |
| | | V5 | |
| | V7 | | V9 |
| The window of Y9; | Y1 | | Y5 |
| | | Y9 | |
| | Y13 | | Y17 |
| The window of Y10; | Y2 | | Y6 |
| | | Y10 | |
| | Y14 | | Y18 |

In the median filter 340, the median_value instead of the mean is selected from the window of U5. For instance, if U1=0, U3=100, U5=100, U7=150 and U9=200, the median_value is U5. Thus, the high-frequency component is not removed from the median filter 340. Here, it is determined according to the offset in the comparator 370 whether the pixel of median_value and the mid_pixel have noise. As illustrated in FIG. 5, the comparator 370 compares the mid_pixel with a reference range predetermined by the median_value and the offset, to determine noise. The comparator 370 outputs the noise coefficient 'ka' which indicates normal pixel data if the mid_pixel exists within a reference range based on the median_value and an offset, and indicates noise if not. The noise coefficient ka is output to the correlation calculator 360. That is, if the mid pixel is more than (median_value+offset), the output noise coefficient ka is defined by {mid_pixel−(median_value+offset)}; if the mid_pixel is less than (median_value−offset), the output noise coefficient ka is defined by {(median_value−offset)−mid_pixel}; and if the mid_pixel exists between (median_value+offset) and (median_value−offset), the output noise coefficient ka is 0. Here, a noise coefficient ka of zero indicates normal data, and noise coefficient ka greater than zero indicates impulse noise.

The correlation calculator 360 receives the noise coefficient ka and calculates the correlation between Y and C(U, V) to output the first and second correlation values kxfade1 and kxfade2 to the cross-fading unit 350. That is, the higher one of the values obtained by multiplying the respective noise coefficient ka of Y9 by that of U and by that of V is the first correlation value kxfade1, and the higher one of the values obtained by multiplying a noise coefficient of Y10 by that of U and that of V is the second correlation value kxfade2. For instance, when the mid_pixels is U5, Y9, V5 and Y10, the respective noise coefficients ka of U5, Y9, V5 and Y10 are k2, k, k3 and k1, and the first and second correlation values kxfade1 and kxfade2 of Y and C may be determined as indicated in the following pseudo-code:

```
LET  kxfade1 = (k*k2)/256;
IF   (k*k3)/256 > kxfade1
     THEN kxfade1 = (k*k3)/256
     ELSE kxfade1 = (k*k2)/256;

LET  kxfade2 = (k1*k2)/256;
IF   (k1*k3)/256 > kxfade2
     THEN kxfade2 = (k1*k3)/256
     ELSE kxfade2 = (k1*k2)/256;
```

That is, the first correlation value kxfade1 is obtained by calculating noise coefficients of Y9, V5 and U5, and the second correlation value kxfade2 is obtained by calculating noise coefficients of Y10, V5 and U5.

The cross-fading unit 350 cross-fades the received mid_pixel and the pixel of the median_value using the first and second correlation values kxfade1 and kxfade2 to output the cross-faded pixels. Thus, in the cross-fading unit 350, the output given by data U5 is equal to:

mid_pixel (1-kxfade1)+kxfade1*median_value

The output given by data Y9 is equal to:

mid_pixel (1-kxfade1)+kxfade1*median_value

The output given by data V5 is equal to:

mid_pixel (1-kxfade)+kxfade1*median_value

The output given by data Y10 is equal to:

mid_pixel (1-kxfade2)+kxfade2*median_value

For instance, if no impulse noise exists, the noise coefficient of the luminance and color is zero and thus kxfade1 is zero, so that the data U5 is output as the mid pixel, and if impulse noise exists, kxfade1 is an integer, thereby causing output data in which the mid_pixel and the pixel of the median_value are cross-faded.

According to the present invention, the impulse noise of the image signal is removed but the high-frequency component still remains, giving high resolution and no deterioration of image quality.

What is claimed is:

1. A method of reducing impulse noise of an image signal including pixels with luminance and color components, comprising the steps of:

selecting a pixel of median_value and a mid pixel from a plurality of pixels;

determining a reference range based on said median_value and an offset;

determining whether said image signal has impulse noise based on a comparison of said mid_pixel and said reference range;

generating a noise coefficient indicative of impulse noise based on said comparison;

calculating a correlation between said luminance and color components depending on said noise coefficient; and cross-fading said pixel of median_value and said mid_pixel depending on said correlation.

2. An apparatus for reducing impulse noise of an image signal including luminance and color components, comprising:

a median filter selecting a pixel of median_value and a mid_pixel from a plurality of pixels;

a comparator determining a reference range based on said median_value and an offset, determining whether said image signal has impulse noise based on a comparison of said mid_pixel and said reference range, and generating a noise coefficient indicative of impulse noise based on said comparison;

a correlation calculator calculating a correlation between said luminance and color components depending on said noise coefficient; and a cross-fading unit for cross-fading said pixel of median_value and said mid_pixel depending on said correlation.

3. The apparatus as set forth in claim 2, wherein said median filter comprises a comparator.

4. The apparatus as set forth in claim 2, wherein:

said reference range is defined by said median_value±said offset; and when said mid_pixel has a value in said reference range said comparator determines said mid_pixel to be normal pixel data, and when said mid_pixel has a value not in said reference range said comparator determines said mid_pixel to have impulse noise.

5. The apparatus as set forth in claim 2, wherein:

said reference range is defined by $$MV \pm Q;$$

when said mid_pixel has a value above said reference range, said noise coefficient is defined by $$ka = MP - (MV+Q);$$

when said mid_pixel has a value below said reference range, said noise coefficient is defined by $$ka = (MV-Q) - MP;\text{ and}$$

when said mid_pixel has a value in said reference range, said noise coefficient is defined by $$ka = 0;$$

where ka is said noise coefficient, MP is said mid_pixel value, MV is said median_value, and Q is said offset.

6. The apparatus as set forth in claim 2, wherein said correlation is defined by a greater of:

a first value obtained by multiplying said noise coefficient of a luminance component Y and said noise coefficient of a color component Respectfully-Y; and a second value obtained by multiplying said noise coefficient of said luminance component Y and said noise coefficient of a color component B-Y.

7. The apparatus as set forth in claim 2, wherein a data output of the cross-fading unit is equal to $$MP(1-CV) + CV*MV$$

where MP is said mid_pixel value, MV is said median_value, and CV is said correlation value.

* * * * *